United States Patent [19]

Teramachi

[11] 4,428,627
[45] Jan. 31, 1984

[54] RECIRCULATING-BALL LINEAR BEARING

[76] Inventor: Hiroshi Teramachi, 2-34-8, Higashi-Tamagawa, Setagaya-Ku, Tokyo, Japan

[21] Appl. No.: 471,267

[22] Filed: Mar. 2, 1983

[30] Foreign Application Priority Data

Mar. 6, 1982 [JP] Japan ................................. 57-35432

[51] Int. Cl.³ ............................................. F16C 29/04
[52] U.S. Cl. .................................................... 308/6 C
[58] Field of Search .............. 308/3 R, 3 A, 6 R, 6 A, 308/6 B, 6 C

[56] References Cited

U.S. PATENT DOCUMENTS

| 3,897,982 | 8/1975 | Teramachi | 308/6 C X |
| 4,253,709 | 3/1981 | Teramachi | 308/6 C |
| 4,296,974 | 10/1981 | Teramachi | 308/6 C |
| 4,310,202 | 1/1982 | Teramachi | 308/6 C |
| 4,361,366 | 11/1982 | Uchiyama | 308/6 C |
| 4,363,526 | 12/1982 | Teramachi | 308/6 C |

Primary Examiner—John Petrakes
Assistant Examiner—David J. Werner
Attorney, Agent, or Firm—Armstrong, Nikaido, Marmelstein & Kubovcik

[57] ABSTRACT

A linear bearing capable of withstanding the load acting in all of downward, upward, and opposite lateral directions as it rolls along a guide rail of I-shaped cross section. Included is a bearing body of inverted-U-shaped cross section having a pair of bearing races of recumbent-Y-shaped cross section secured to its opposed inner surfaces. Each bearing race has formed thereon a pair of ball raceways of arcuate cross section opposed to a like pair of ball raceways on the head of the guide rail. The bearing body and the bearing races define therebetween two pairs of ball return passageways of circular cross section extending parallel to the two pairs of ball raceways on the bearing races. Fastened to the opposite ends of the bearing body and the bearing races, a pair of segmented end covers have formed therein hairpin grooves each intercommunicating one of the raceways on the bearing races and one adjacent return passageway in order to allow recirculation of a group of antifriction balls. A pair of cages extend along the respective pairs of raceways on the bearing races for rollably holding the antifriction balls thereon. The cages are slotted to permit the balls to partly project therethrough into rolling engagement with the raceways on the guide rail.

11 Claims, 18 Drawing Figures

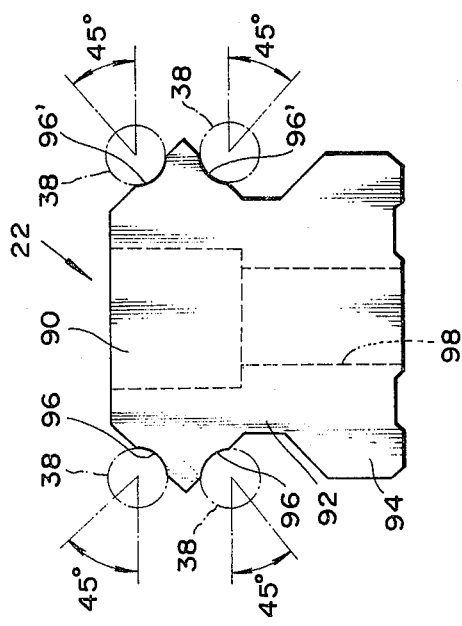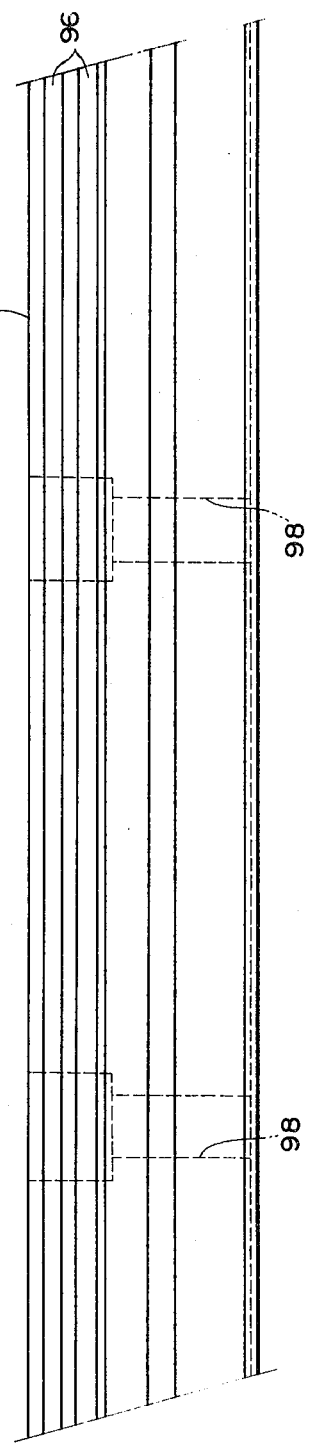

RECIRCULATING-BALL LINEAR BEARING

BACKGROUND OF THE INVENTION

This invention relates to a linear bearing for use in moving an object along a rectilinear path with a minimum of friction. More specifically the invention pertains to a linear bearing of the type incorporating groups of recirculating antifriction balls and wherein the direction of action of the load transmitted can be either downward, upward, or opposite lateral directions. The linear bearing according to the invention finds applications in machine tools, machining centers, and a variety of other pieces of machinery or equipment wherein one part is to be moved linearly relative to another.

Japanese Patent Laying-Open No. 55-72912, filed by the assignee of the instant application, discloses a linear bearing of the type under consideration. It has a bearing body of inverted-U-shaped cross section mounted astride a guide rail via groups of antifriction balls for rolling movement thereon. The bearing body has ball raceways of arcuate cross section formed longitudinally on its inner surfaces, and ball return passageways extending longitudinally therethrough. Screwed to the opposite ends of the bearing body, a pair of end covers have each formed therein curved grooves each intercommunicating one raceway and one adjacent return passageway in the bearing body. Thus, as the linear bearing travels in either direction along the guide rail, the antifriction balls recirculate along the raceways and through the return passageways.

The above prior art linear bearing can largely well accomplish the purposes for which it is intended. It has, however, proved to have certain problems in the fabrication of some of its components.

One of the problems concerns the bearing body with its ball raceways and ball return passageways. The machine-shaping of these raceways and passageways, as by grinding and broaching, has been a difficult task because of the complex shape of the bearing body. Consequently the raceways and passageways have not necessarily been shaped to close tolerances. Too much time has also been expended for the job, adding to the manufacturing cost of the linear bearing.

There is another reason why the creation of the ball raceways and return passageways in the bearing body is undesirable. The ball raceways require hardening as by induction heating and subsequent quenching. Again because of the complex shape of the bearing body, however, a difficulty has been encountered in hardening only its desired parts. Thus the bearing body has been easy to suffer strain, or its entire desired parts have not necessarily been hardened to a required degree.

Another problem has arisen in conjunction with the pair of end covers fastened to the bearing body to provide the curved grooves intercommunicating the ball raceways and return passageways in the bearing body. The end covers in the noted prior art linear bearing have been each integrally molded of plastics material. The one-piece molding of each end cover is objectionable by reason of its complex shape. Having approximately the same shape as the cross section of the bearing body, the end covers have formed therein not only the curved grooves serving as parts of the closed ball paths but also annular depressions and other recesses. Much difficulties have been involved in the production of molds for such complex shapes and in the control of the heat and pressure conditions for the molding of the end covers therein. Some errors in the dimensions of the molded end covers have therefore been almost unavoidable, resulting in the hindrance of the rolling of the antifriction balls in the curved grooves in the end covers. The fabrication of such unitary end covers have also been very time-consuming and so added considerably to the cost of the linear bearing.

A further problem with the prior art linear bearing concerns a unitary cage rollably holding the antifriction balls on the raceways on the bearing body. Generally horseshoe-shaped in cross section to conform to the interior contours of the bearing body, the cage has slots formed longitudinally therein allow the balls to make rolling engagement with raceways on the guide rail. The cage is made from sheet steel by means of a press. Here again the complex shape of the cage has rendered it difficult to create the slots in exact positions thereon, with the consequent impediment of the travel of the balls in proper rolling engagement with the raceways on the bearing body and on the guide rail.

SUMMARY OF THE INVENTION

In view of the listed problems of the prior art the present invention seeks, in a recirculating-ball linear bearing of the type defined, to make easier the machine-shaping and subsequent hardening of the ball raceways and return passageways in the bearing body.

The invention also seeks to facilitate the fabrication of the end covers and cage of the linear bearing by segmenting or splitting them and hence to reduce the manufacturing cost of the linear bearing while assuring the smooth, aligned rolling of the antifriction balls under load.

The invention also seeks to expedite the assemblage of the linear bearing by providing a simplified method of retaining the cage segments in position.

The invention also seeks to enhance the rigidity of the cage segments for making possible the provision of linear bearings of any desired longitudinal dimension Stated in its broadest aspect, the invention provides a recirculating-ball linear bearing comprising a bearing body substantially in the shape of an inverted U in cross section. A pair of bearing races are secured to the inner surfaces of the bearing body in opposed relation to each other. Each bearing race has a pair of ball raceways of arcuate cross section formed longitudinally thereon in opposed relation to a like pair of ball raceways on the other bearing race. Also formed on each bearing race are a pair of channels of arcuate cross section which are opposed to a similar pair of channels on the bearing body to define in combination therewith a pair of ball return passageways. Thus, between the bearing body and the bearing races, there are formed two pairs of ball return passageways associated with the respective pairs of ball raceways on the bearing races. Attached to the opposite ends of the bearing body and the bearing races, a pair of end covers have each formed therein four hairpin grooves each intercommunicating one of the raceways on the bearing races and the adjacent one of the return passageways between the bearing body and the bearing races. Four closed paths are thus completed for the recirculation of respective groups of antifriction balls. The linear bearing further comprises cage means for rollably holding the antifriction balls on the raceways on the bearing races.

Particular attention is directed to the fact that the bearing body and the pair of bearing races form separate units in accordance with the invention, as contrasted with the prior art wherein the bearing races are integral with the body. The machine-shaping and hardening of the ball raceways and channels on the separate bearing races are much easier than heretofore. This advantage, combined with the fact that the drilling of the ball return passageways through the bearing body has become unnecessary, contributes materially to the reduction of the manufacturing cost of the linear bearing. Further the accurate machining and positive hardening of the separate bearing body and bearing races with their ball raceways and channels assure the more frictionless rolling of the antifriction balls and the more reliable operation of the bearing for an extended length of time.

According to a further feature of the invention the pair of end covers are each segmented into a pair of lateral halves. Each end cover segment is of course much smaller in size and simpler in shape than the conventional unitary end cover. The production of the molds for the end cover segments, and the molding of these segments therein, are therefore both far easier than hitherto. Molded in exact dimensions specified, the pair of segmented end covers with the hairpin grooves therein serve to realize the smoother recirculation of the balls. The easier fabrication of the end covers also helps to reduce the manufacturing cost of the linear bearing.

A still further feature of the invention resides in the cage means which, in a preferred embodiment, comprises a pair of discrete cages each extending along the pair of ball raceways on one of the ball races. Each cage takes the form of a strip of steel or like rigid material bent into the shape of a V in cross section to provide a pair of divergent web portions. Each web portion has a slot formed longitudinally therein to allow the antifriction balls on one raceway on one bearing race to partly project therethrough for rolling engagement with a corresponding one of raceways on a guide rail.

It will be appreciated that the production of the separate cages by the pressing of sheet metal is much easier and less time-consuming than if they are of one piece, thus also contributing to the cost reduction of the device. Moreover, since the separate cages each with the pair of slots are manufacturable to very close tolerances, they help to make smoother the rolling of the balls between the bearing races and the guide rail under load.

Preferably each cage has flanges extending along the opposite sides thereof for higher rigidity. Thus the pair of cages are both of W-shaped cross section in the preferred embodiment disclosed herein. The improved rigidity of the cages makes it possible to increase the longitudinal dimension of the linear bearing as required. The W-section cages, moreover, can be readily mounted in position on the bearing as their opposite ends are engaged in retainer grooves of corresponding shape formed in the pair of end covers. This feature greatly facilitates the assemblage of the linear bearing.

The above and other features and advantages of this invention and the manner of attaining them will become more apparent and the invention itself will best be understood, from a study of the following description of the preferred embodiment and the appended claims, with reference had to the attached drawings.

BRIEF DESCRIPTION OF THE DRAWINGS

FIG. 17 is an end elevation of the guide rail for use with the linear bearing of FIG. 1; and FIG. 18 is a fragmentary side elevation of the guide rail of FIG. 17.

DESCRIPTION OF THE PREFERRED EMBODIMENT

General

Figure 1:
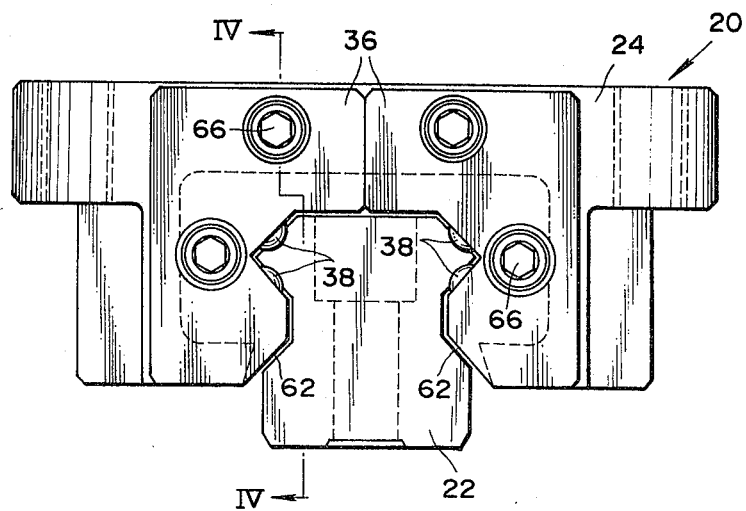
FIG. 1 is an end elevation of the recirculating-ball linear bearing embodying the principles of this invention, the linear bearing being herein shown mounted on a guide rail along which it is to roll.
Figure 2:
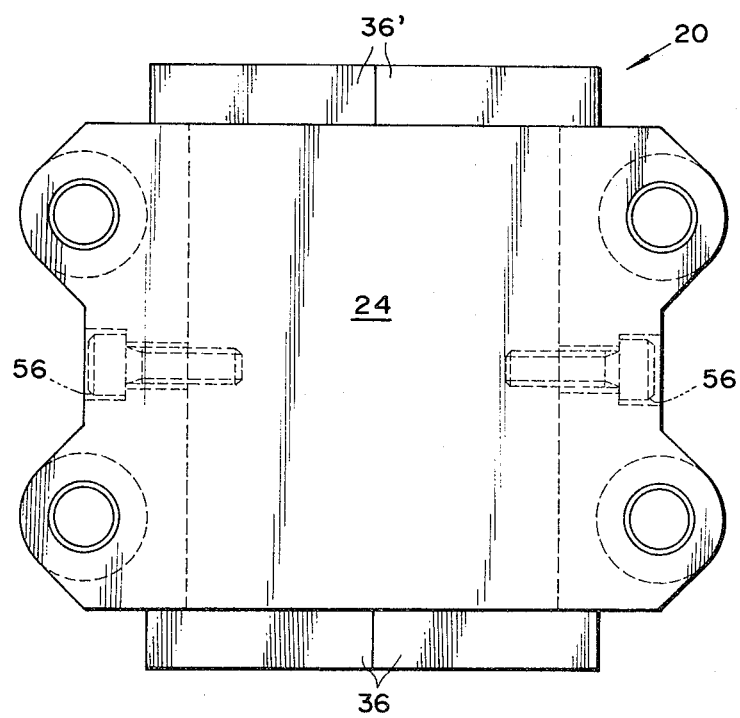
FIG. 2 is a top plan of the linear bearing.

Reference is first directed to FIGS. 1 to 5 in order to describe the general organization of the recirculating-ball linear bearing in accordance with the invention, generally designated 20 therein. It will be noted that the linear bearing 20 is shown together with a guide rail 22 in FIGS. 1 and 3. Placed astride this guide rail, the linear bearing is to roll in either direction thereon.

Basically the recirculating-ball linear bearing 20 of FIGS. 1 to 5 comprises:

1. A bearing body 24 substantially in the shape of an inverted U in cross section having two pairs of channels 26 and 26', FIG. 3, of arcuate cross section formed longitudinally on its inside surfaces.

2. A pair of horizontally opposed bearing races 28 and 28', FIG. 3, rigidly mounted internally of the bearing body 24 and each having a pair of channels 30, 30' of arcuate cross section formed thereon in opposed relation to one pair of channels 26, 26' on the bearing body to define ball return passageways 32, 32' of substantially circular cross section, each bearing race also having a pair of ball raceways 34, 34' of arcuate cross section formed longitudinally thereon.

3. A pair of segmented end covers 36 and 36' screwed or otherwise fastened to the opposite ends of the bearing body 24 and of the bearing races 28 and 28' and serving to communicate the four ball raceways 34 and 34' on the bearing races with the respective ball return passageways 32 and 32' as in FIG. 5.

4. Four groups of rolling antifriction balls 38 capable of separately recirculating along the four raceways 34 and 34' and through the four return passageways 32 and 32'.

5. A pair of cages 40 and 40', FIGS. 3 to 5, each extending along the pair of ball raceways 34, 34' on one bearing race 28, 28' for rollably holding the antifriction balls 38 thereon in a manner allowing their rolling engagement with the guide rail 22.

All but the antifriction balls 38 of the listed components of the linear bearing 20, as well as the guide rail 22 for use therewith, will be discussed in further detail hereinbelow under the respective headings.

Bearing Body

Figure 6:
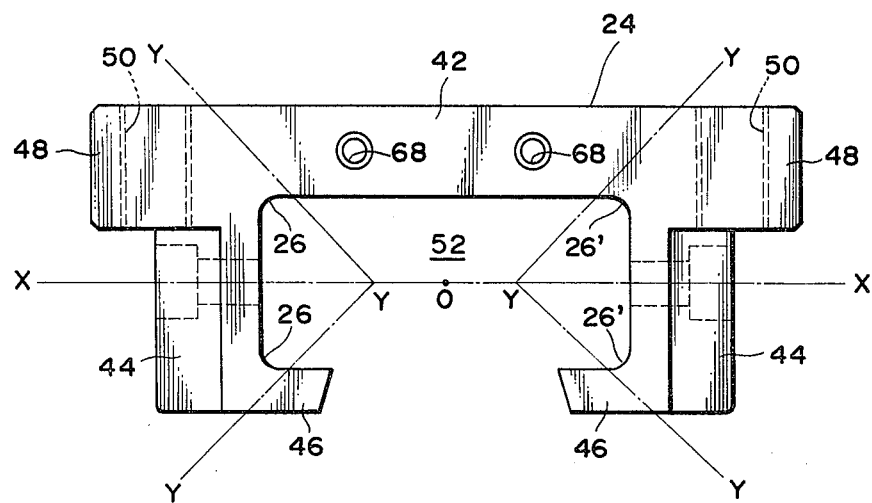
FIG. 6 is an end elevation of the bearing body in the linear bearing of FIG. 1.

As illustrated by itself in FIG. 6, the bearing body 24 comprises a generally flat bridge portion 42 to be laid normally horizontally over the guide rail, and a pair of aprons 44 depending from the opposite sides of the bridge portion throughout its length. The sprongs 44 have rims or flanges 46 turned inwardly, or toward each other, from their bottom ends. The bearing body further includes a pair of wings 48 projecting from its opposite sides. The wings 48 have each a suitable number of mounting holes 50 formed vertically therethrough. These mounting holes are intended for use in attaching the bearing body to an object to be moved along the guide rail, by means of screws or other fastener elements passing therethrough.

In the bearing body of the above configuration the bridge portion 42 and the pair of rimmed aprons 44 may be considered to bound in combination a generally rectangular space, designated 52, as viewed as in FIG. 6. The noted two pairs of channels 26 and 26' of arcuate cross section are arranged at the four corners of the rectangular space 52. Thus each pair of channels 26, 26' are vertically spaced from and parallel to each other. As viewed cross sectionally, or in an end view as in FIG. 6, each channel is curved with a radius approximately equal to, or slightly more than, the radius of each antifriction ball to roll thereon.

For the best results the bearing body 24 should be a precision die casting of a lightweight metal. An aluminum alloy is particularly recommended. The reduction in the weight of the bearing body, and therefore in the inertia of the complete bearing, is an important factor for its successful operation in applications where the object being carried by the bearing must travel at high speed, with frequent starts and stops.

Bearing Races

Figure 7:
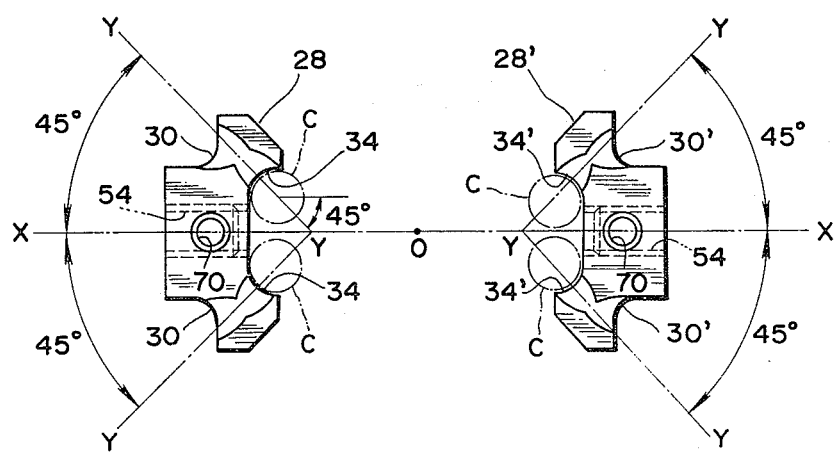
FIG. 7 is an end elevation of the pair of bearing races in the linear bearing of FIG. 1.

FIG. 7 is a detailed representation of the pair of bearing races 28 and 28' formed as discrete units separate from the bearing body 24 in accordance with a feature of the invention. The bearing races have each a tapped mounting hole 54 formed transversely therethrough. As seen in both FIGS. 2 and 3, the bearing races are mounted to the opposed inner surfaces of the bearing body 24 as by cap screws 56 driven into their mounting holes 54.

Figure 3:
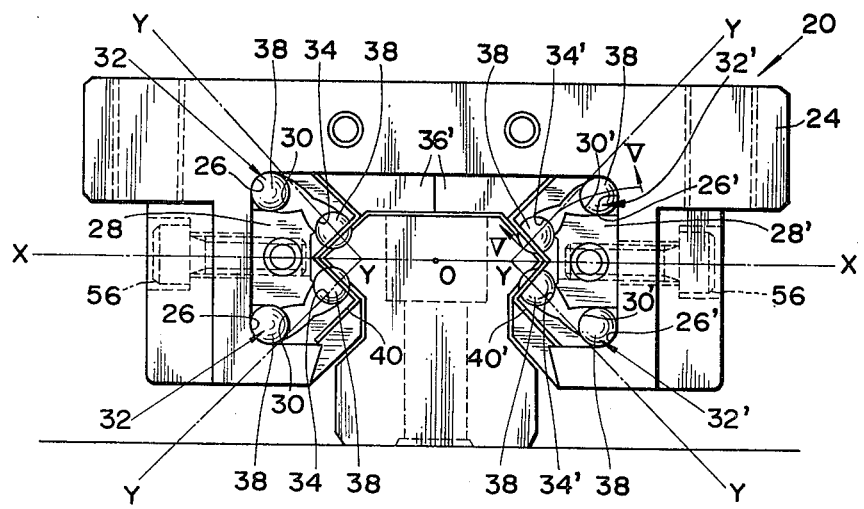
FIG. 3 is a view similar to FIG. 1 except that one of the pair of segmented end covers of the linear bearing is removed to reveal the inner details of the bearing.

Thus mounted in position on the bearing body, the bearing races 28 and 28' are each in the shape of a recumbent Y in cross section, with their divergent limbs held opposite to each other. The two pairs of channels 30 and 30' on the bearing races are, as seen cross sectionally, each curved with a radius approximately equal to, or slightly more than, the diameter of each antifriction ball. As best seen in FIG. 3, the channels 30 and 30' on the bearing races 28 and 28' and the channels 26 and 26' on the bearing body 24 define in combination the four ball return passageways 32 and 32' extending parallel to each other and to the ball raceways 34 and 34' on the bearing races. Preferably each ball return passageway is of circular cross section with a diameter slightly more than that of the antifriction balls 38 so that the balls may travel therethrough with minimal frictional resistance.

Formed on the opposed inner surfaces of the bearing races 28 and 28', on the other hand, are the two pairs of ball raceways 34 and 34' extending parallel to each other. Each pair of raceways are vertically spaced from each other. As seen cross sectionally, or in an end view as in FIG. 7, each raceway is curved with a radius approximately equal to that of the antifriction balls 38.

It will be observed from FIGS. 3, 6 and 7 that each pair of raceways 34, 34' are arranged in bilateral symmetry with respect to a horizontal plane X—X passing the geometric center 0 of the aforesaid space 52 bounded by the bearing body 24. The letter C in FIG. 7 represents a notional circle of which the cross section of each raceway forms an arc. The plane Y—Y passing the longitudinal median line of each raceway and the center of the circle C associated therewith is at an angle of 45 degrees to the horizontal plane X—X. To turn this statement around is to say that the planes Y—Y passing the longitudinal median lines of the four raceways 34 and 34' and the centers of the notional circles C are angularly spaced 90 degrees from each other.

Since each raceway 34, 34' on the bearing races 28 and 28' is curved as aforesaid with a radius substantially equal to that of each antifriction ball to roll thereon, the notional circles C of FIG. 7 can be thought of as representing the antifriction balls rolling thereon. With the four raceways 34 and 34' thus arranged and angled relative to each other, the linear bearing 20 when placed on the guide rail via the antifriction balls can most effectively bear the load acting thereon in all of upward, downward, rightward and leftward directions.

Figure 8:
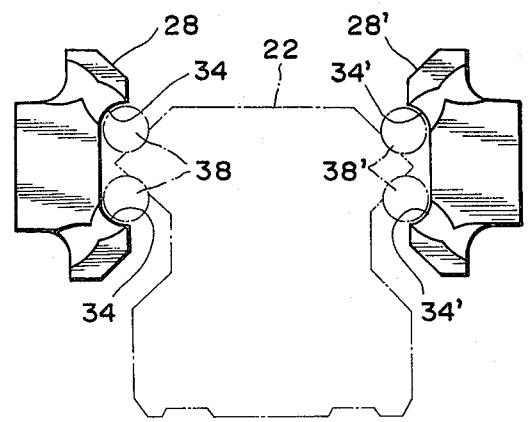
FIG. 8 is an end view explanatory of the relative positional relationship among the pair of bearing races, the guide rail, and the antifriction balls rollably engaged therebetween, in the linear bearing of FIG. 1.

As will be understood upon brief inspection of FIG. 8, the antifriction balls 38 on the raceways 34 and 34' on the bearing races 28 and 28' also make rolling engagement with similar raceways of arcuate cross section on the guide rail 22. The raceways on the guide rail are opposed to the raceways on the bearing races, as will be later explained in more detail. Thus, when the linear bearing is preloaded or actually loaded in use, the four groups of antifriction balls 38 can be firmly caught between the bearing race raceways 34 and 34' and the guide rail raceways against any possibility of slippage. When heavily loaded, moreover, the antifriction balls undergo elastic deformation for contact with the raceways over greater areas, thus enabling the bearing to firmly support the load on the guide rail. Further, being elastically deformable between the bearing race raceways and the guide rail raceways, the antifriction balls can take up some dimensional or mounting errors of the other bearing components to assure satisfactory performance of the bearing under load.

Refernce is now directed back to FIGS. 3, 6 and 7 in order to explain the placement of the two pairs of ball return passageways 32 and 32' in relation to the two pairs of ball raceways 34 and 34' on the bearing races 28 and 28'. Like the pairs of raceways 34 and 34' on the bearing races 28 and 28', each pair of channels 26, 26' on the bearing body 24 and each pair of channels 30, 30' on the bearing races are bilaterally symmetrical with respect to the horizontal plane X—X passing the geometric center 0 of the space 52 bounded by the bearing body.

The pairs of ball return passageways 32 and 32' formed by the bearing body channels 26 and 26' and the bearing race channels 30 and 30' are, of necessity, each more spaced from each other than are each pair of raceways 34, 34' on the bearing races. Each pair of ball return passageways are, however, still positioned inwardly of the planes Y—Y passing the longitudinal median lines of the associated pair of raceways 34, 34' and the centers of the antifriction balls 34 thereon. This arrangement makes it possible to correspondingly reduce the vertical dimension of the bearing body 24 without appreciably sacrificing its strength or rigidity. The bearing body of reduced vertical dimension possesses greater stability against load forces, particularly against those applied in its transverse direction.

It should also be appreciated that the pair of aprons 44 of the bearing body 24 have each a very substantial thickness or transverse dimension. The great thickness of the aprons is intended to enhance their rigidity and hence to preclude the possibility of their outward bending under load. Thus, even though the pair of bearing races 28 and 28' are mostly held against the aprons 44, the aprons with their rims 46 can positively retain the bearing races in position.

End Covers

FIGS. 9 to 12 illustrate one of the pair of segmented end covers 36 and 36' fastened to the opposite ends of the bearing body 24 and of the bearing races 28 and 28'. Since both end covers are of identical make, only one of them, 36, will be described in detail, it being understood that the same description applies to the other end cover 36'.

Figure 9:
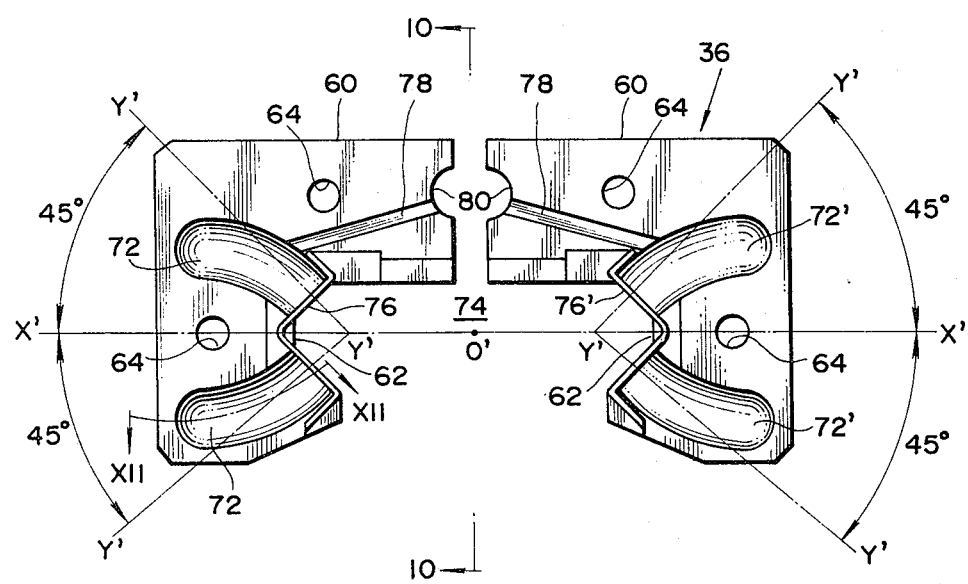
FIG. 9 is an elevation showing the inside surface of one of the pair of segmented end covers in the linear bearing of FIG. 1.

With particular reference to FIG. 9, which shows the inner surface of the representative end cover 36, it will be recognized that the end cover is composed of a pair of discrete lateral halves or segments 60. The end cover segments are to be separately fabricated as by the injection molding of a synthetic resin or by the die casting of a metal or alloy. Either way, the individual end cover segments will be fabricated much easier, and more accurately dimensioned, than if the complete end cover is molded or cast in one piece.

Each end cover segment 60 is substantially L-shaped. In combination the two segments make up the inverted-U-shaped end cover 36. The shape and size of the end cover is such that it covers at least the major portion of the end face of the bearing body 24 and the complete end faces of the bearing races 28 and 28', as will be seen also from FIG. 1. It will further be noted from this figure that the inside edges 62 of the end cover closely correspond to the cross sectional shape of the guide rail 22.

Figure 4:
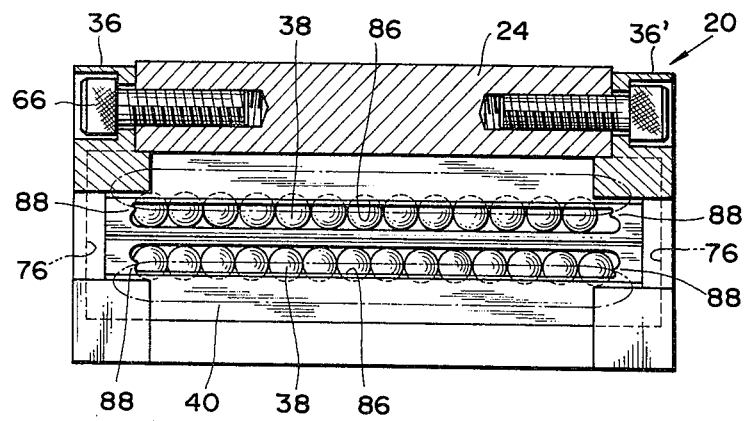
FIG. 4 is a longitudinal section through the linear bearing, taken along the line IV—IV of FIG. 1.
Figure 5:
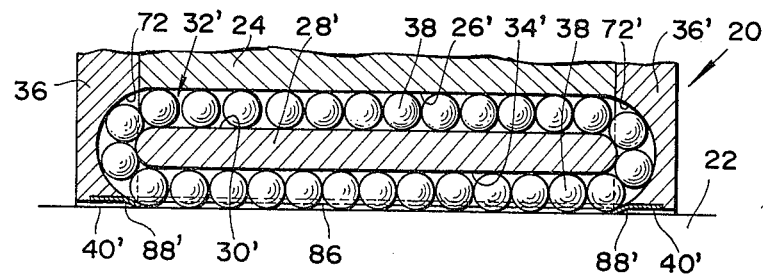
FIG. 5 is a fragmentary, longitudinal section through the linear bearing, taken along the line V—V of FIG. 3, the view showing in particular one of the closed paths for the recirculation of a group of antifriction balls.

Designated 64 in FIG. 9 are a plurality of, four in the illustrated embodiment, counterbored mounting holes in the end cover 36. Fastener elements such as cap screws 66, FIGS. 1 and 4, are to be inserted into and through these mounting holes in attaching the end cover to one of the opposite faces of the bearing body and of each bearing race. As seen in FIG. 6, the bearing body 24 has two tapped holes 68 in each end face. FIG. 7 shows that the bearing races 28 and 28' have each a tapped hole 70 in each end face. Passing the mounting holes 64 in the end cover 36, the screws 66 are driven into these holes 68 and 70 in the bearing body and the bearing races. It will be appreciated that the screws fastening the end covers to the opposite ends of the bearing races serve also to firmly hold the bearing races in preassigned positions relative to the bearing body and the end covers.

With reference back to FIGS. 9 to 12 two pairs of hairpin grooves 72 and 72' are formed in the inner face of the end cover 36 which makes direct contact with one of the end faces of the bearing body 24 and of each bearing race 28, 28'. The two pairs of hairpin grooves 72 and 72' are formed in the respective segments 60 of the end cover 36. Each hairpin groove 72, 72' intercommunicates one of the ball raceways 34 and 34' on the bearing races 28 and 28' and the adjacent one of the ball return passageways 30 and 30' between the bearing body and the bearing races in the manner best pictured in FIG. 5. The hairpin grooves 72 and 72' are curved not only in the plane of FIg. 5 but also in a plane at right angles therewith, as in FIG. 9.

As viewed in FIG. 9, each pair of hairpin grooves 72, 72' are bilaterally symmetrical with respect to a horizontal plane X'—X' passing the geometric center 0' of the space 74 bounded by the inner edges 62 of the end cover 36. The center 0' of the space 74 agrees with the center 0 of the space 52, FIG. 6, defined by the bearing body 24, so that the plane X'—X' also coincides with the plane X—X of FIGS. 3, 6 and 7.

A line Y'—Y' tangent to each hairpin groove 72, 72' at its end in communication with one of the ball raceways 34 and 34' on the bearing races is at an angle of 45 degrees to the horizontal plane X'—X'. Extending from this end toward the other, each hairpin groove rather gently curves toward the horizontal plane X'—X' and terminates at the point where it communicates with one of the ball return passageways 32 and 32' between the bearing body and the bearing races.

The foregoing will have made clear that each hairpin groove 72, 72' in the end cover 36 has its opposite ends in communication with one extremity of one of the ball raceways 34 and 34' on the bearing races and with one extremity of one of the ball return passageways 32 and 32' between the bearing body and the bearing races. Thus the hairpin grooves 72 and 72' serve as hairpin curves between the ball raceways 34 and 34' and the ball return passageways 32 and 32'. The other extremities of the ball raceways and the ball return passageways are of course understood to be likewise intercommunicated via similar hairpin grooves in the other end cover 36'. Accordingly each ball raceway and one adjacent ball return passageway, in combination with two associated hairpin grooves in the end covers, make up a closed path, as in FIG. 5, for the recirculation of one group of antifriction balls 38.

Figure 10:
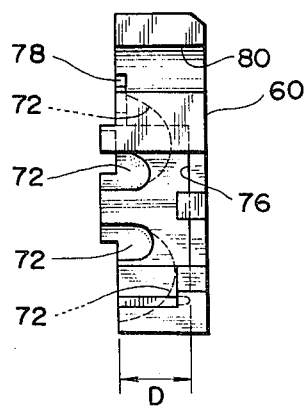
FIG. 10 is a side elevation of one of the end cover segments as seen in the direction of the arrows 10—10 in FIG. 9.
Figure 11:
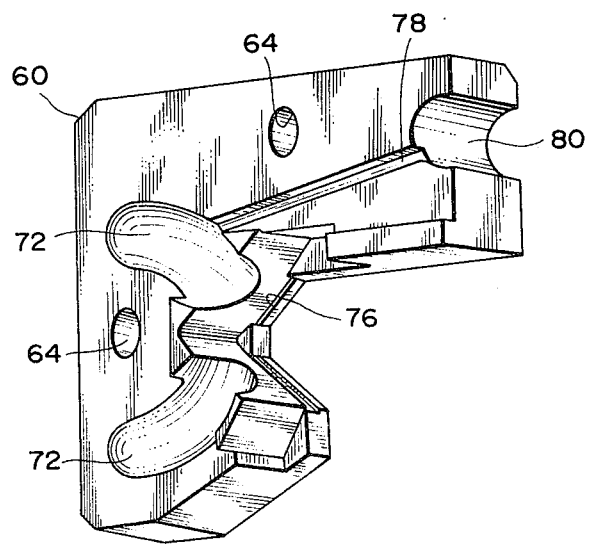
FIG. 11 shows in perspective and on an enlarged scale the end cover segment of FIG. 10.
Figure 12:
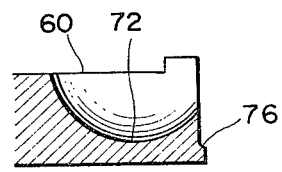
FIG. 12 is a section through one of the end cover segments, taken along the line XII—XII of FIG. 9.
Figure 13:
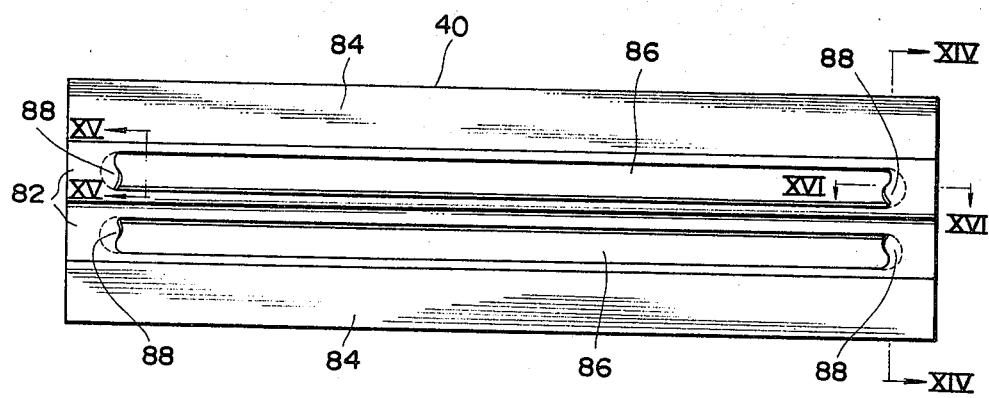
FIG. 13 is an elevation of one of the pair of cages in the linear bearing of FIG. 1.

The representative end cover 36 of FIGS. 9 to 11 has also a pair of cage retainer grooves 76 and 76' formed one in the inner face of each segment 60. Intended to closely receive one of the opposite longitudinal ends of one of the cages 40 and 40', each retainer groove 76, 76' has the exact cross sectional shape of each cage. The depth D, FIG. 10, of each retainer groove is considerably more than half the thickness of the end cover 36. The cross sectional shape of the cages 40 and 40' is yet to be studied. The shape of each retainer groove will also become clear from the subsequent discussion of the cages. For the moment, therefore, suffice it to say that the retainer grooves 76 and 76' have portions extending across the respective pairs of hairpin grooves 72 and 72' at their ends lying next to the ball raceways 34 and 34' on the bearing races.

Preferably, and as shown in FIGS. 9 to 11, the end cover 36 should have formed therein a pair of grooves 78 extending from semicircular recesses 80 in the opposed inner edges of the end cover segments 60 to the upper hairpin grooves 72 and 72'. These grooves 78 serve to direct grease into the ball paths of the bearing. The pair of recesses 80 in the end cover segments combine to form a hole for the reception of a grease nipple which is not shown because of its conventional nature.

Cages

FIGS. 13 to 16 illustrate in detail one of the pair of cages 40 and 40' for guiding the antifriction balls 38 and restraining them from lateral displacement as they roll between the raceways 34 and 34' on the bearing races 28 and 28' and the raceways on the guide rail 22. Both are exactly alike in construction, so that only one of them, 40, will be described in detail, with the understanding that the same description applies to the other cage 40'.

Figure 14:
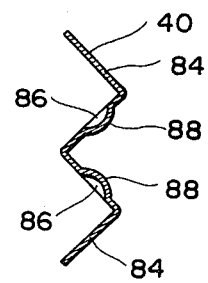
FIG. 14 is a section through the cage, taken along the line XIV—XIV of FIG. 13.
Figure 15:
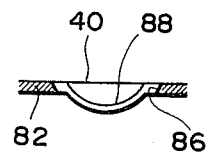
FIG. 15 is a fragmentary section through the cage, taken along the line XV—XV of FIG. 13.
Figure 16:
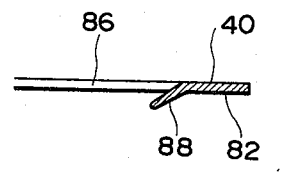
FIG. 16 is also a fragmentary section through the cage, taken along the line XVI—XVI of FIG. 13.

The representative cage 40 is fabricated by pressing a strip of steel or like rigid material into the shape of a V in cross section to provide a pair of divergent web portions 82. Further, in the illustrated embodiment, the cage 40 is formed to include a pair of flanges 84 formed on and extending along the opposite sides thereof and bent approximately right angularly therefrom. As a whole, therefrom, the cage 40 is of approximately W-shaped cross section as best seen in FIG. 14. The flanges 84 function to add ridigity to the cage. It will be understood that only one flange could be formed along one side of the cage. In this case the cage would have a Z-shaped cross section.

As has been stated with reference to FIG. 9 in particular, the W-shaped cross section of the cage 40 corresponds to the shape of each retainer groove 76, 76' in each end cover 36, 36'. The cage 40 is mounted just inwardly of the pair of raceways 34 on the bearing race 28 by having its opposite end portions closely engaged in the retainer grooves 76 in the end covers 36 and 36', as clearly shown in FIGS. 4 and 5.

Each of the divergent web portions 82 of the cage 40 has a slot 86 formed longitudinally therein and terminating short of its opposite ends. Each slot 86 has a width appropriately less than the diameter of the antifriction balls 38. More specifically the width of each slot 86 must be such that, rolling along one of the raceways 34 on the bearing race 28, the antifriction balls partly project inwardly through the slot into rolling engagement with the corresponding one of the raceways on the guide rail 22.

The cage 40 is further formed to include a pair of tongues 88 at the opposite extremities of each slot 86. Each tongue 88 is bent away from the plane of the corresponding web portion 82 toward the guide rail 22, thereby forming an extension of one of the hairpin grooves in the end covers. As will be best understood upon consideration of FIG. 5, the tongues (therein designated 88' as they belong to the other cage 40') of the cage 40 are intended to assure the smooth transition of the antifriction balls 38 between the raceways on the bearing races and the hairpin grooves in the end covers.

Thus the pair of cages 40 and 40' with their tongues 88 and 88' perform the important function of guiding the antifriction balls along the raceways on the bearing races and to and from the hairpin grooves in the end covers. Their rigidity must be sufficiently high for that function. The steel-made cages may therefore be hardened by a suitable heat treatment.

FIG. 3 best depicts the attitudes of the pair of cages 40 and 40' when they are mounted in place on the bearing, with their opposite end portions engaged in the W-shaped retainer grooves in the pair of end covers. In these working positions the cages should have the longitudinal median lines of their slots contained in the planes Y—Y explained in conjunction with FIGS. 6 and 7.

Guide Rail

FIGS. 17 and 18 are the end and side elevations, respectively, of the guide rail 22 for use with the recirculating-ball linear bearing 20 constructed as in the foregoing. The guide rail is herein shown as the T- or I-shaped cross section, having a head 90, a web 92, and a flange base 94. Formed on both sides of the head 90 of the guide rail and extending longitudinally thereof are two pairs of ball raceways 96 and 96' for relative rolling engagement with the respective groups of antifriction balls 38 on the corresponding pairs of raceways on the bearing races.

As viewed cross sectionally, or in an end view as in FIG. 17, each raceway 96, 96' on the guide rail 22 is also curved with a radius approximately equal to that of each antifriction ball. Further the planes passing the longitudinal median lines of the raceways 96 and 96' and the centers of the antifriction balls 38 in rolling engagement therewith are each set at an angle of 45 degrees to the plane of the horizon. These angular orientations of the raceways on the guide rail, and the corresponding angular orientations of the raceways on the bearing races, are essential for deriving the full load-bearing capacity from the linear bearing of this invention in every possible direction of load action.

The guide rail 22 has any required number of counterbored holes 98 created therethrough at longitudinal spacings. These holes are to receive suitable fastener elements in mounting the guide rail on the bed of a machine tool or on any other desired part.

Operation

While the operation of the recirculating-ball linear bearing 20 is believed to be largely apparent from the foregoing, further amplification will be made in the following brief summary of such operation. In use the object to be moved linearly relative to the part on which is laid the guide rail 22 may be mounted on the linear bearing 20 and secured thereto by means of fastener elements passing the mounting holes 50 in the wings 48 of the bearing body 24.

As the linear bearing 20 travels in either direction along the guide rail 22, the four groups of antifriction balls 38 roll between the raceways 34 and 34' on the bearing races 28 and 28' and the raceways 96 and 96' on the guide rail 22 as guided by the pair of cages 40 and 40'. At the trailing end of the bearing the tongues 88 and 88' of the cages 40 and 40' direct the successive balls 38 into the hairpin grooves 72 and 72' in one of the end covers 36 and 36'. The load on the bearing is no longer transmitted to the balls as they flow into the hairpin grooves. The balls subsequently enter the return passageways 32 and 32' between the bearing body 24 and the bearing races 28 and 28' and travel therethrough in the same direction as the traveling direction of the bearing relative to the guide rail. Then, via the hairpin grooves 72 and 72' in the end cover at the leading end of the bearing, the balls reenter the spaces between the raceways 34 and 34' on the bearing races and the raceways 96 and 96' on the guide rail, again bearing the load on the bearing 20.

Thus, during the travel of the linear bearing 20 along the guide rail 22, the four groups of antifriction balls 38 constantly recirculate along the respective closed paths formed by the raceways 34 and 34' on the bearing races and the raceways 96 and 96' on the guide rail, the hairpin grooves 72 and 72' in the end covers, and the return passageways 32 and 32' between the bearing body and the bearing races. The direction in which the balls roll along these closed paths is of course subject to change depending upon the traveling direction of the bearing 20 on the guide rail 22.

It will, of course, be understood that various changes may be made in the form, details, arrangements, and proportions of the parts to conform to the specific requirements of use, without departing from the scope of the invention as set forth in the following claims.

What is claimed is:

1. A recirculating-ball linear bearing capable of withstanding the load acting thereon in four orthogonal directions, comprising:
   (a) a bearing body of substantially inverted-U-shaped cross section having two pairs of channels of arcuate cross section formed longitudinally on inner surfaces thereof;
   (b) a pair of bearing races rigidly mounted to the inner surfaces of the bearing body in opposed relation to each other, each bearing race having a pair of channels of arcuate cross section formed longitudinally thereon in opposed relation to one pair of channels on the bearing body, the pair of channels on each bearing race and the corresponding pair of channels on the bearing body defining in combination a pair of return passageways of substantially circular cross section, each bearing race also having a pair of raceways of arcuate cross section formed longitudinally thereon in opoosed relation to a like pair of raceways on the other bearing race;
   (c) a pair of end covers secured to the opposite ends of the bearing body and the bearing races, each end cover having formed therein hairpin grooves each intercommunicating one raceway on one bearing race and the adjacent one of the return passageways defined between the bearing body and the bearing races;
   (d) groups of recirculating antifriction balls capable of rolling along the respective raceways and through the respective return passageways separately communicated therewith via the hairpin grooves in the end covers; and
   (e) cage means for rollably holding the antifriction balls on the raceways on the bearing races.

2. The recirculating-ball linear bearing as recited in claim 1, wherein the bearing body is made of an aluminum alloy.

3. The recirculating-ball linear bearing as recited in claim 1, wherein each raceway on the bearing races is, as viewed cross-sectionally, curved with a radius approximately equal to the radius of each antifriction ball, and wherein the planes passing the longitudinal median lines of the raceways and the centers of the antifriction balls thereon are angularly spaced 90 degrees from each other.

4. The recirculating-ball linear bearing as recited in claim 1, wherein each bearing race is of substantially recumbent Y-shaped cross section.

5. The recirculating-ball linear bearing as recited in claim 1, wherein the pair of end covers are each segmented into a pair of lateral halves, each half of each end cover having formed therein one pair of hairpin grooves intercommunicating one pair of raceways and one adjacent pair of return passageways.

6. The recirculating-ball linear bearing as recited in claim 1, wherein the cage means comprises a pair of discrete cages each extending along the pair of raceways on one of the bearing races, each cage being in the form of a strip of rigid material bent substantially into the shape of a V in cross section to provide a pair of divergent web portions, each web portion of each cage having formed therein a slot extending along one of the raceways on the bearing races, the slot having a width less than the diameter of each antifriction ball to allow the antifriction balls to partly project inwardly therethrough as they roll along one of the raceways.

7. The recirculating-ball linear bearing as recited in claim 6, wherein each cage has a pair of flanges extending along the opposite sides thereof so that the cage as a whole is W-shaped in cross section.

8. The recirculating-ball linear bearing as recited in claim 6, wherein each cage is supported in position by having the opposite ends thereof closely engaged in retainer grooves formed in the pair of end covers.

9. The recirculating-ball linear bearing as recited in claim 6, wherein each cage has a pair of tongues formed at the opposite extremities of each slot therein to assure smooth transfer of the antifriction balls between the corresponding one of the raceways on the bearing races and the associated hairpin grooves in the end covers.

10. The recirculating-ball linear bearing as recited in claim 1, in combination with a guide rail along which the linear bearing is to roll, the guide rail having a head having formed thereon two pairs of raceways of arcuate cross section for relative rolling engagement with the respective groups of antifriction balls on the raceways on the bearing races.

11. The recirculating-ball linear bearing as recited in claim 10, wherein each raceway on the head of the guide rail is, as viewed cross sectionally, curved with a radius approximately equal to the radius of each antifriction ball, and wherein the planes passing the longitudinal median lines of the raceways on the head of the guide rail and the centers of the antrifriction balls in rolling engagement therewith are angularly spaced 90 degrees from each other.

* * * * *